Feb. 12, 1929.  L. OXHANDLER  1,701,632
CUSHIONED FLAT FOR CELLULAR FILLERS
Filed March 7, 1927
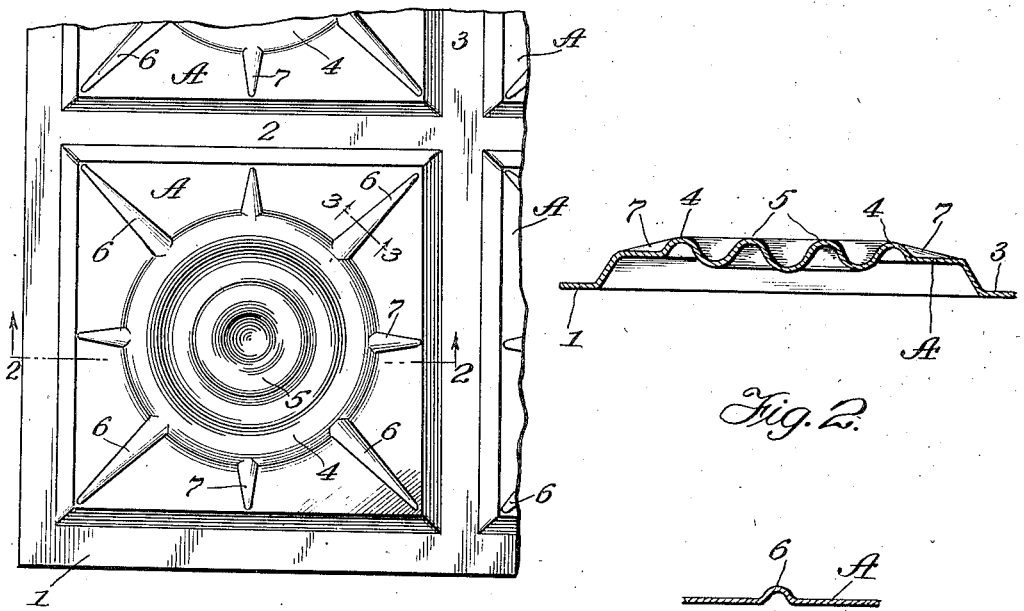
Fig. 1.
Fig. 2.
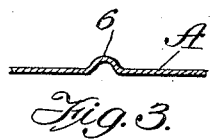
Fig. 3.
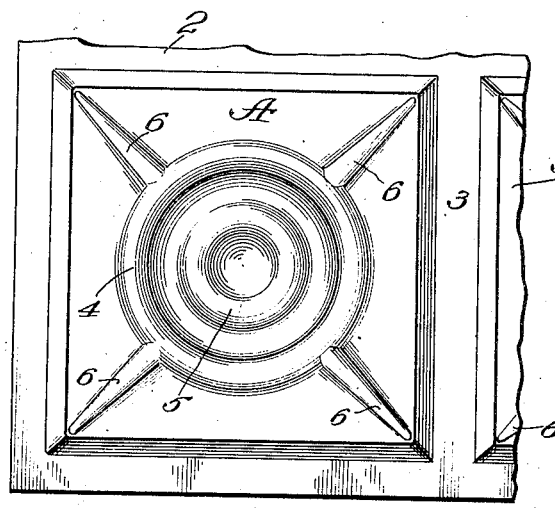
Fig. 4.
Inventor:
Leopold Oxhandler,
By Wm. F. Freudenreich,
Atty.

Patented Feb. 12, 1929.

1,701,632

UNITED STATES PATENT OFFICE.

LEOPOLD OXHANDLER, OF CHICAGO, ILLINOIS.

CUSHIONED FLAT FOR CELLULAR FILLERS.

Application filed March 7, 1927. Serial No. 173,529.

The present invention relates to the packaging of fragile articles, particularly eggs, in such a way that they may be handled in the ordinary way and be shipped without danger of breakage. The principal object of the present invention is to produce a flat adapted to be employed with a cellular filler to lock the walls of the same against displacement, cushion an egg or other article lying in each cell, and provide recesses or depressions to hold liquid discharged from an egg in the event that an egg cracks, and localize such liquid in the area forming the bottom of the cell in which that particular egg is located.

There are at present in use flats provided with cup-shaped holders that lock each egg in a fixed position. If a crate of eggs packed between flats of this kind is given a heavy jar, the shells of the eggs must move with the crate, but the liquid contents of the egg shells are not restrained and therefore the inertia thereof tends to remain stationary while the shells are moving, causing a disturbance of the contents which eventually results in the settling of the yokes of the eggs to the bottom and consequent deterioration of the eggs. A further object of the present invention is to produce a simple and novel means of packaging eggs so that each egg will be housed in a secure compartment, be effectively cushioned, but be permitted to play about freely within the compartment so as to avoid the destructive influences arising from the locking of eggs in fixed relation to the crate.

In my prior application Serial No. 112,193 I have shown one form of flat embodying the same general idea as the present invention and, viewed in one of its aspects, the present invention may be said to have for its object to improve on the details of the flat shown in the aforesaid application.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of one corner of a flat arranged in accordance with my invention; Fig. 2 is a section taken on line 2—2 of Fig. 1; Fig. 3 is a section taken on line 3—3 of Fig. 1; and Fig. 4 is a view similar to Fig. 1, showing a modification.

Referring to Figures 1 to 3 of the drawing, 1 represents a sheet of fibrous material embossed or shaped in the process of manufacture to divide it into squares A spaced apart from each other by means of grooves or troughs 2 and 3 arranged at right angles to each other and open on the same face of the sheet. The device constitutes a flat upon which may be set any usual or suitable cellular filler, the intersecting walls or partitions of which rest in the grooves between the squares or sections. These flats are preferably made of comparatively soft material that will form an effective cushion, and therefore if the squares or little plateaus are left plain, they may easily become deformed and reduce the efficiency of the flat as a locking means for the cell walls. Furthermore, if an article that is packaged rests simply on a flat section of paper or pulp, the latter will not form an effective cushion between the same and an underlying article. Moreover, in the event that the article to be packaged is an egg and the egg cracks, the liquid will run off from the flat square or section and be spread over perhaps a considerable area of the flat. Each square or section is therefore provided with a central portion formed of annular corrugations 4 and 5, from the outer of which radiate smaller corrugations 6 and 7 extending to the four corners of the section and to approximately the middle points of the four sides of the section. Therefore the sides of the elevated sections are stiffened and braced to prevent distortion and an egg or other article will be supported on corrugations and thus be effectively cushioned; and any liquid that may run out of an egg or other supported article will ordinarily be confined in the valleys of the corrugations. The corrugations may be disposed at various elevations with respect to the plane of the flat top of the square or section, but I prefer that the corrugations 4 and 5 shall extend, at least in part, above such plane, and that the corrugations 6 and 7 lie above such plane. The corrugations 6 and 7 are in effect, ribs in the form of inverted troughs, decreasing gradually in width and depth from the outer toward the inner ends.

In Fig. 4 the construction is the same as that in the first three figures, excepting that the short corrugations 7 are omitted.

My improved flat may be made by either a molding or embossing process, lending itself particularly to the latter. In embossing flats, the sheet of fibrous material which has been formed from a body of pulp is passed through rotary dies while still containing a very large amount of moisture; the dies being designed to press the flat sheet into the desired shape. I have found that by laying a piece of strong cloth or other fabric on the wet sheet, as it passes through the dies, the danger of tearing or cutting the sheet is greatly reduced, and there can thus be obtained a perfect product where otherwise the product would be full of holes. In some instances the cloth or other flexible fabric may be placed on both sides of the sheet to be embossed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A flat comprising a sheet of approximately uniform thickness throughout divided into plateau-like sections by intersecting grooves, the central portion of each section containing a plurality of concentric annular corrugations, and there being trough-like ribs radiating from the outermost corrugation.

2. A flat comprising a sheet of approximately uniform thickness throughout divided into plateau-like sections by intersecting grooves, the central portion of each section being corrugated, and there being diagonal reinforcing ribs in the form of inverted troughs radiating from said central portion in each section.

3. A flat comprising a sheet of approximately uniform thickness throughout divided into plateau-like sections by intersecting grooves, each section having a central corrugated portion raised somewhat above the plane thereof, and reinforcing ribs in the form of inverted troughs radiating from the central corrugated portion of each section and lying above said plane.

4. A flat comprising a sheet of approximately uniform thickness throughout divided into plateau-like sections by intersecting grooves, each section having an annular corrugation extending above the plane thereof, and diagonal reinforcing ribs lying above said plane and radiating from said corrugation.

In testimony whereof, I sign this specification.

LEOPOLD OXHANDLER.